United States Patent
Shah et al.

(10) Patent No.: US 11,356,942 B2
(45) Date of Patent: Jun. 7, 2022

(54) METHODS AND APPARATUSES FOR SELECTING A RADIO LINK IN A MOBILE COMMUNICATION SYSTEM

(71) Applicant: Panasonic Intellectual Property Corporation of America, Torrance, CA (US)

(72) Inventors: Rikin Shah, Langen (DE); Joachim Loehr, Langen (DE); Takako Hori, Osaka (JP); Hidetoshi Suzuki, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 132 days.

(21) Appl. No.: 16/476,179

(22) PCT Filed: Nov. 21, 2017

(86) PCT No.: PCT/EP2017/079896
§ 371 (c)(1),
(2) Date: Jul. 5, 2019

(87) PCT Pub. No.: WO2018/127322
PCT Pub. Date: Jul. 12, 2018

(65) Prior Publication Data
US 2019/0357137 A1    Nov. 21, 2019

(30) Foreign Application Priority Data

Jan. 5, 2017 (EP) .................................... 17150464

(51) Int. Cl.
*H04W 48/20* (2009.01)
*H04W 24/10* (2009.01)
(Continued)

(52) U.S. Cl.
CPC ........... *H04W 48/20* (2013.01); *H04W 24/10* (2013.01); *H04W 80/02* (2013.01); *H04W 80/08* (2013.01)

(58) Field of Classification Search
CPC ...................................................... H04W 48/20
See application file for complete search history.

(56) References Cited

U.S. PATENT DOCUMENTS

2009/0253433 A1   10/2009  Voyer et al.
2012/0176910 A1*   7/2012  Cui ....................... H04W 24/10
                                                                    370/241
(Continued)

FOREIGN PATENT DOCUMENTS

CN    101568142 A    10/2009
CN    104519583 A     4/2015
(Continued)

OTHER PUBLICATIONS

3GPP TR 38.801 V1.0.0, "3rd Generation Partnership Project; Technical Specification Group Radio Access Network; Study on New Radio Access Technology; Radio Access Architecture and Interfaces (Release 14)," Dec. 2016, 72 pages.
(Continued)

*Primary Examiner* — Sulaiman Nooristany
(74) *Attorney, Agent, or Firm* — Seed IP Law Group LLP

(57) ABSTRACT

The present disclosure relates to user equipment in a mobile communication system. The UE comprises processing circuitry, which in operation, determines at least one radio link via which a first base station is to forward data packets to the user equipment. The user equipment is connectable to both the first base station via a first radio link and to a second base station via a second radio link. The UE further comprises a transmitter, which in operation, transmits a radio link selection message to the first base station. The radio link selection message comprises information on the determined at least one (Continued)

one radio link for instructing the first base station via which at least one radio link to forward the data packets to the user equipment.

18 Claims, 6 Drawing Sheets

(51) Int. Cl.
*H04W 80/02* (2009.01)
*H04W 80/08* (2009.01)

(56) References Cited

U.S. PATENT DOCUMENTS

| | | | |
|---|---|---|---|
| 2014/0113630 | A1 | 4/2014 | Vangala et al. |
| 2016/0234726 | A1 | 8/2016 | Nuggehalli et al. |
| 2016/0255619 | A1 | 9/2016 | Yi et al. |
| 2016/0337916 | A1* | 11/2016 | Deenoo ............. H04W 36/0094 |
| 2017/0041102 | A1* | 2/2017 | Lu ......................... H04W 16/14 |
| 2018/0124642 | A1* | 5/2018 | Phuyal ................. H04W 24/10 |
| 2019/0098606 | A1* | 3/2019 | Sharma ................ H04B 7/0404 |

FOREIGN PATENT DOCUMENTS

| | | |
|---|---|---|
| CN | 105659690 A | 6/2016 |
| CN | 106304218 A | 1/2017 |
| EP | 2 107 731 A1 | 10/2009 |
| JP | 2009-246966 A | 10/2009 |
| WO | 2013/126859 A2 | 8/2013 |
| WO | 2015/044771 A2 | 4/2015 |
| WO | 2016/049431 A1 | 3/2016 |

OTHER PUBLICATIONS

3GPP TR 38.913 V14.0.0, "3rd Generation Partnership Project; Technical Specification Group Radio Access Network; Study on Scenarios and Requirements for Next Generation Access Technologies; (Release 14)," Oct. 2016, 39 pages.
3GPP TS 36.213 V14.1.0, "3rd Generation Partnership Project; Technical Specification Group Radio Access Network; Evolved Universal Terrestrial Radio Access (E-UTRA); Physical layer procedures (Release 14)," Dec. 2016, 414 pages.
3GPP TS 36.321 V14.1.0, "3$^{rd}$ Generation Partnership Project; Technical Specification Group Radio Access Network; Evolved Universal Terrestrial Radio Access (E-UTRA); Medium Access Control (MAC) protocol specification (Release 14)," Dec. 2016, 98 pages.
3GPP TS 36.322 V13.2.0, "3rd Generation Partnership Project; Technical Specification Group Radio Access Network; Evolved Universal Terrestrial Radio Access (E-UTRA); Radio Link Control (RLC) protocol specification (Release 13)," Jun. 2016, 45 pages.
3GPP TS 36.323 V14.0.0, "3rd Generation Partnership Project; Technical Specification Group Radio Access Network; Evolved Universal Terrestrial Radio Access (E-UTRA); Packet Data Convergence Protocol (PDCP) specification (Release 14)," Sep. 2016, 39 pages.
3GPP TS 36.331 V14.0.0, "3rd Generation Partnership Project; Technical Specification Group Radio Access Network; Evolved Universal Terrestrial Radio Access (E-UTRA); Radio Resource Control (RRC); Protocol specification (Release 14)," Sep. 2016, 644 pages.
International Search Report, dated Feb. 22, 2018, for corresponding International Application No. PCT/EP2017/079896, 3 pages.
Extended European Search Report, dated Jul. 12, 2017, for corresponding European Application No. 17150464.0-1505, 11 pages.
Chinese Office Action dated Dec. 3, 2020, for the corresponding Chinese Patent Application No. 201780082102.4, 23 pages. (With English Translation).
Ericsson, ST-Ericsson, "Overall procedures for offloading over Xn," R2-132715, Agenda Item: 7.2.2, 3GPP TSG-RAN WG2 Meeting #83, Barcelona, Spain, Aug. 19-23, 2013, 9 pages.
Huawei, HiSilicon, "Study of Solutions and Radio Protocol Architecture for Dual-Connectivity," R2-131164, Agenda Item: 7.2, 3GPP TSG-RAN WG2 Meeting #81bis, Chicago, USA, Apr. 15-19, 2013, 12 pages.
Chinese Office Action, dated May 19, 2021, for Chinese Application No. 201780082102.4, 20 pages. (with English Translation).
3GPP TS 36.323 V14.1.0, "3$^{rd}$ Generation Partnership Project; Technical Specification Group Radio Access Network; Evolved Universal Terrestrial Radio Access (E-UTRA); Packet Data Convergence Protocol (PDCP) specification (Release 14)," pp. 15-17 and 20, Dec. 2016, 5 pages.
Ericsson, "Overview of RRC architecture options for the LTE-NR tight interworking," R2-164005, Agenda Item: 9.4.1.2, 3GPP TSG-RAN WG2 #94, Nanjing, China, May 23-27, 2016, 6 pages.
Fujitsu, "Flow Control for DC based on PDCP status report," R3-140665, Agenda Item: 20.1.4, 3GPP TSG-RAN WG3 Meeting #83bis, San Jose Del Cabo, Mexico, Mar. 31-Apr. 4, 2014, 3 pages.
Intel Corporation, "UL Support for LWA," R2-163572, 3GPP TSG-RAN2 Meeting #94, Nanjing, China, May 23-27, 2016, 4 pages.
Japanese Office Action, dated Jun. 22, 2021, for Japanese Application No. 2019-534654, 15 pages. (with English translation),.

* cited by examiner

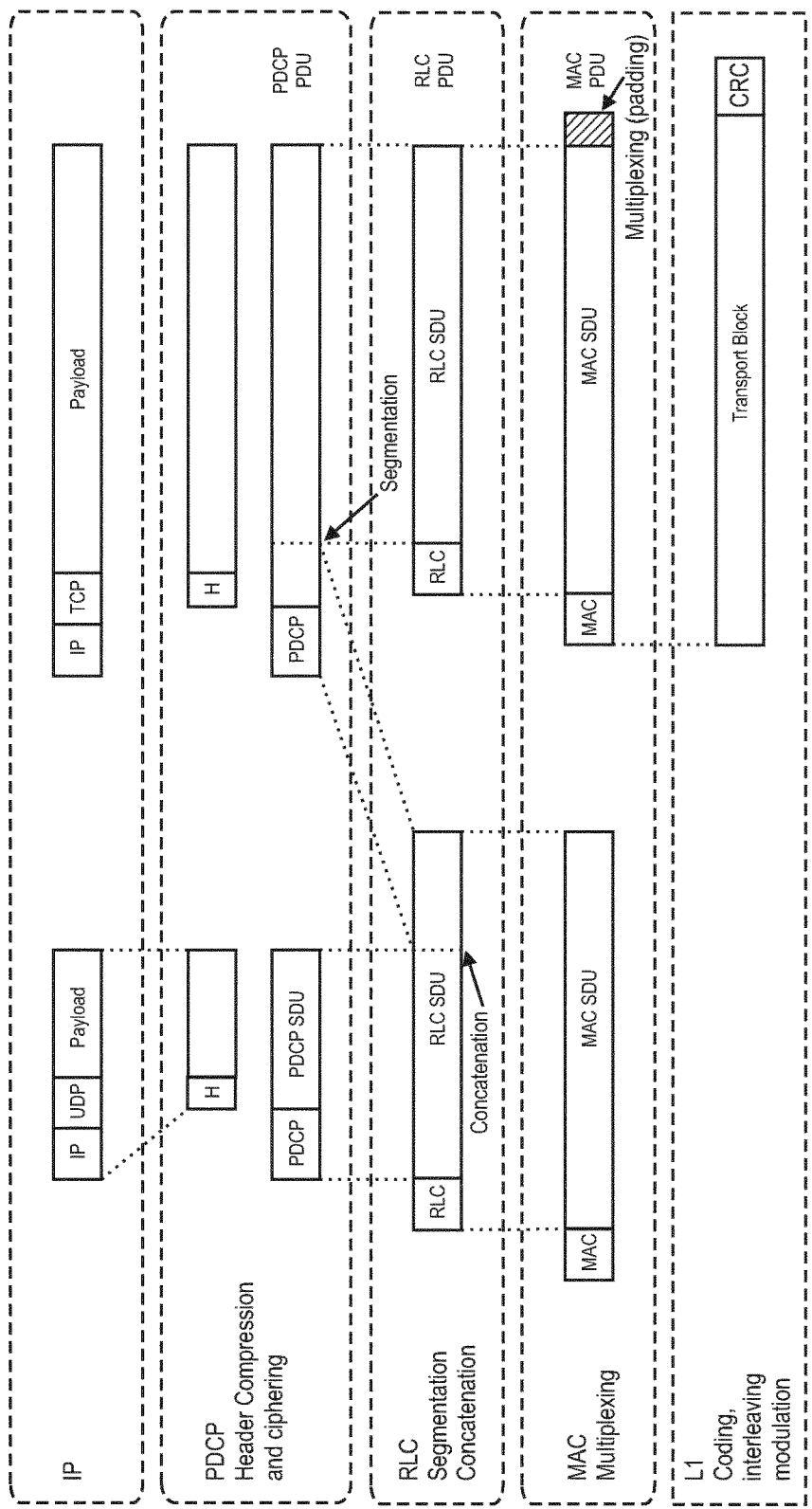

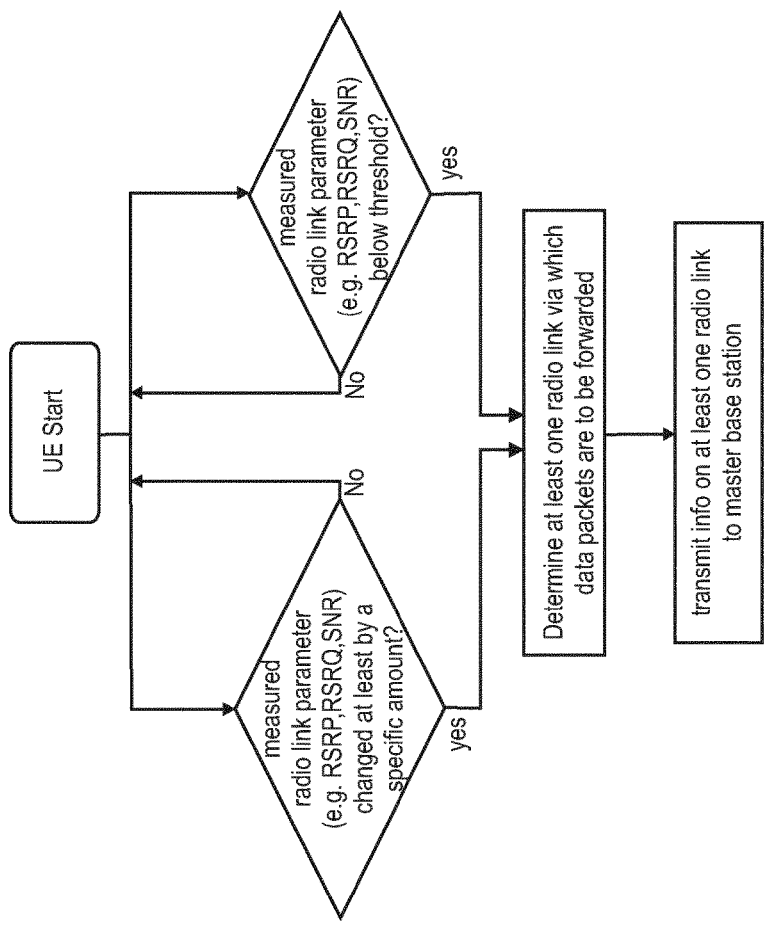
Fig. 12
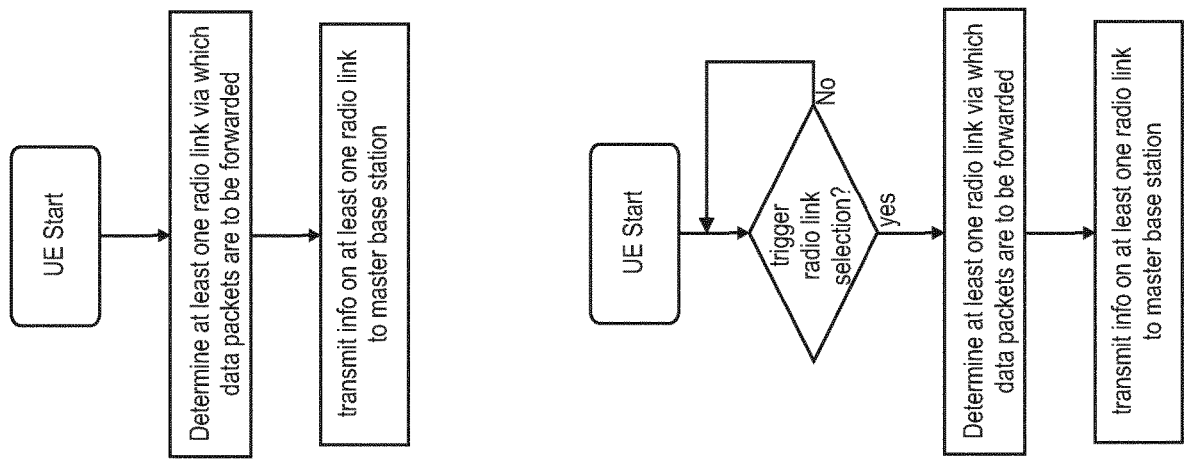
Fig. 10
Fig. 11

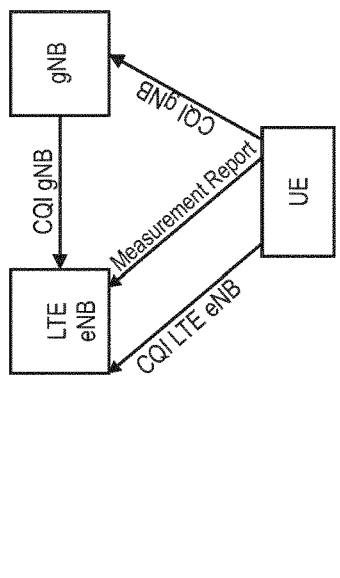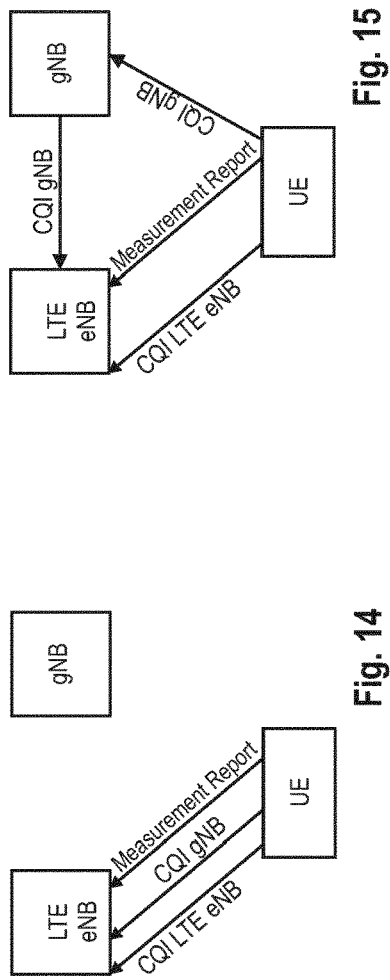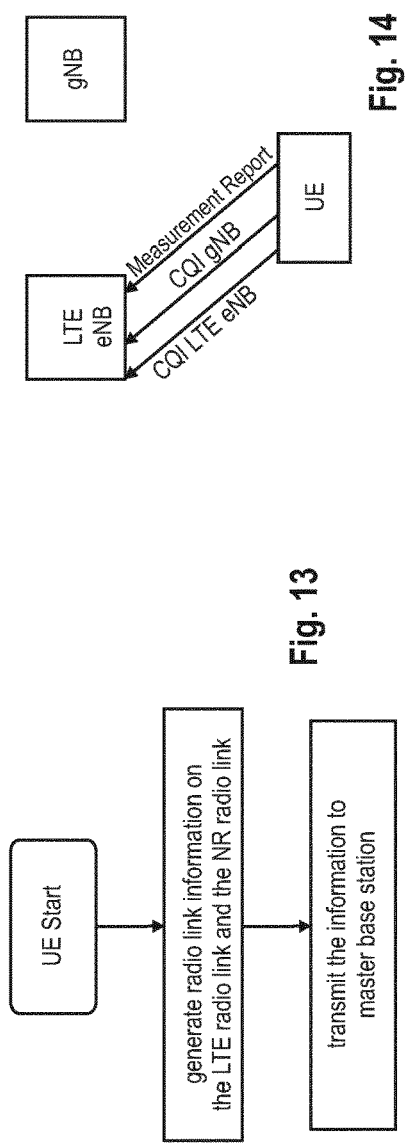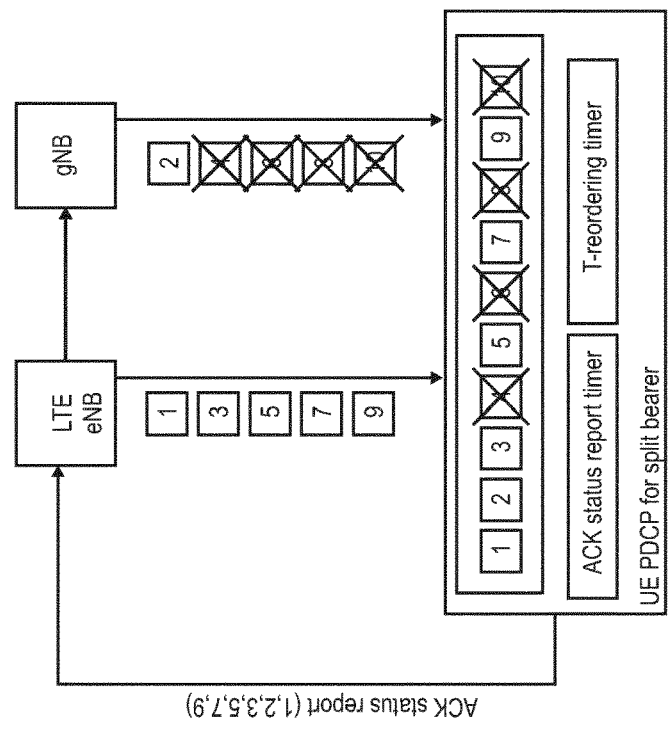

METHODS AND APPARATUSES FOR SELECTING A RADIO LINK IN A MOBILE COMMUNICATION SYSTEM

BACKGROUND

Technical Field

The present disclosure is directed to a data forwarding method, devices and articles in communication systems, such as, 3GPP communication systems.

Description of the Related Art

Currently, the 3rd Generation Partnership Project (3GPP) works at the next release (Release 15) of technical specifications for the next generation cellular technology, which is also called fifth generation (5G). At the 3GPP Technical Specification Group (TSG) Radio Access network (RAN) meeting #71 (Gothenburg, March 2016), the first 5G study item, "Study on New Radio Access Technology" involving RAN1, RAN2, RAN3 and RAN4 was approved and is expected to become the Release 15 work item that defines the first 5G standard.

The aim of the study item is to develop a "New Radio (NR)" access technology (RAT). which operates in frequency ranges up to 100 GHz and supports a broad range of use cases, as defined during the RAN requirements study (see e.g., 3GPP TR 38.913 "Study on Scenarios and Requirements for Next Generation Access Technologies", current version 14.0.0 available at www.3gpp.org and incorporated herein its entirety by reference).

One objective is to provide a single technical framework addressing all usage scenarios, requirements and deployment scenarios defined in TR 38.913, at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include the scenarios with large number of devices with non-time critical data transfers such as smart wearables and sensor networks. A second objective is to achieve forward compatibility. Backward compatibility to Long Term Evolution (LTE, LTE-A) cellular systems is not required, which facilitates a completely new system design and/or the introduction of novel features.

The fundamental physical layer signal waveform will be based on OFDM, with potential support of a non-orthogonal waveform and multiple access. For instance, additional functionality on top of OFDM such as DFT-S-OFDM, and/or variants of DFT-S-OFDM, and/or filtering/windowing is further considered. In LTE, CP-based OFDM and DFT-S-OFDM are used as waveform for downlink and uplink transmission, respectively. One of the design targets in NR is to seek a common waveform as much as possible for downlink, uplink and sidelink.

Besides the waveform, some basic frame structure(s) and channel coding scheme(s) will be developed to achieve the above-mentioned objectives. The study shall also seek a common understanding on what is required in terms of radio protocol structure and architecture to achieve the above-mentioned objectives. Furthermore, the technical features which are necessary to enable the new RAT to meet the above-mentioned objectives shall be studied, including efficient multiplexing of traffic for different services and use cases on the same contiguous block of spectrum.

Since the standardization for the NR of $5^{th}$ Generation systems of 3GPP is at the very beginning, there are several issues that remain unclear. For instance, it remains unclear how data provision is to be efficiently implemented in multi-connectivity scenarios where UE(s) are connected to both cells using a previous communication technology (such as LTE or LTE-A of 3GPP) and the new communication technology (NR) of the 3GPP $5^{th}$ Generation.

BRIEF SUMMARY

One non-limiting and exemplary embodiment facilitates providing improved data provision procedures.

In one general first aspect, the techniques disclosed here feature a user equipment in a mobile communication system. The UE comprises processing circuitry, which in operation, determines at least one radio link via which a first base station is to forward data packets to the user equipment. The user equipment is connectable to both the first base station via a first radio link and to a second base station via a second radio link. The UE further comprises a transmitter, which in operation, transmits a radio link selection message to the first base station. The radio link selection message comprises information on the determined at least one radio link for instructing the first base station via which at least one radio link to forward the data packets to the user equipment.

In one general first aspect, the techniques disclosed here feature a method for operating a user equipment in a mobile communication system. The method comprises the following steps performed by the user equipment. At least one radio link via which a first base station is to forward data packets to the user equipment is determined. The user equipment is connectable to both the first base station via a first radio link and to a second base station via a second radio link. A radio link selection message is transmitted to the first base station. The radio link selection message comprises information on the determined at least one radio link for instructing the first base station via which at least one radio link to forward the data packets to the user equipment.

In one general first aspect, the techniques disclosed here feature a first base station in a mobile communication system. A receiver of the first base station, when in operation, receives a radio link selection message from a user equipment. The user equipment is connectable to both the first base station via a first radio link and to a second base station via a second radio link. The radio link selection message comprises information on an at least one radio link via which the first base station is to forward data packets to the user equipment. Processing circuitry of the first base station, when in operation, determines at least one radio link via which to forward the data packets to the user equipment, based on the received radio link selection message. A transmitter of the first base station, when in operation, forwards the data packets via the determined at least one radio link to the user equipment.

In one general second aspect, the techniques disclosed here feature a user equipment in a mobile communication system. Processing circuitry of the user equipment, when in operation, generates radio link information on a first radio link and on a second radio link. The user equipment is connectable to both a first base station via the first radio link and to a second base station via the second radio link for exchanging data packets. A transmitter of the user equipment, when in operation, transmits the generated radio link information to the first base station to be used by the first base station for determining at least one radio link via which to forward the data packets to the user equipment.

In one general second aspect, the techniques disclosed here feature a method for operating a user equipment in a mobile communication system. The method comprises the following steps. Radio link information on a first radio link and on a second radio link is generated. The user equipment is connectable to both a first base station via the first radio link and to a second base station via the second radio link for exchanging data packets. The generated radio link information is transmitted to the first base station to be used by the first base station for determining at least one radio link via which to forward the data packets to the user equipment.

In one general third aspect, the techniques disclosed here feature a first base station in a mobile communication system. A receiver of the first base station, when in operation, receives from the user equipment radio link information on a first radio link and on a second radio link. The user equipment is connected to both the first base station via the first radio link and to a second base station via the second radio link for exchanging data packets. Processing circuitry of the first base station, when in operation, determines at least one radio link via which the data packets are to be forwarded to the user equipment. A transmitter of the first base station, when in operation, forwards the data packets via the determined at least one radio link to the user equipment.

It should be noted that general or specific embodiments may be implemented as a system, a method, an integrated circuit, a computer program, a storage medium, or any selective combination thereof.

Additional benefits and advantages of the disclosed embodiments will be apparent from the specification and Figures. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

In the following exemplary embodiments are described in more detail with reference to the attached figures and drawings.

FIG. 5 illustrates the format of a PDCP Control PDU, FIG. 13 illustrates a simplified and exemplary flow diagram for a UE behavior according to another solution of the present disclosure, FIGS. 14, 15 show different options not to provide the channel conditions feedback from the UE to the LTE eNodeB according to one variant of the solution, FIGS. 16 and 17 illustrate a downlink data provision of PDCP PDUs of a split a bearer and a corresponding ACK status report feedback from the UE to the LTE eNodeB according to still another solution of the present disclosure.

DETAILED DESCRIPTION

Basis of the Present Disclosure

As presented in the background section, 3GPP is working at the next release for the 5$^{th}$ generation cellular technology, simply called 5G, including the development of a new radio access technology (NR) operating in frequencies ranging up to 100 GHz.

Figure 1:
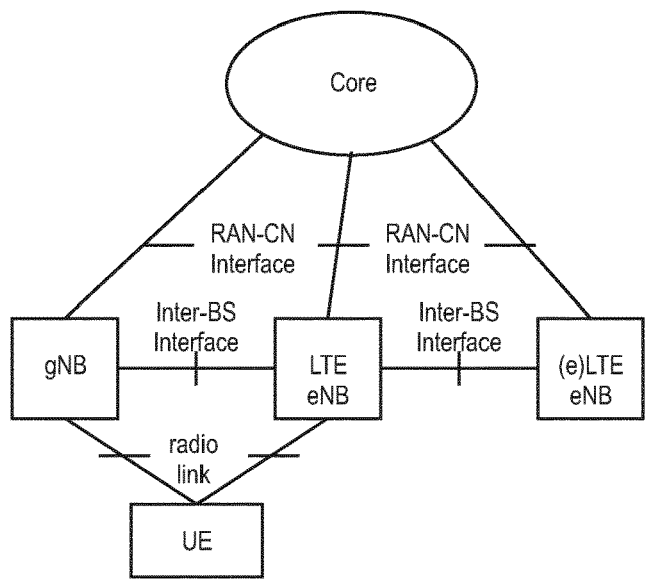
FIG. 1 shows an exemplary architecture for a 3GPP NR system, where a UE is connected to both a gNB and an LTE eNB.

Various different deployment scenarios are currently being discussed for being supported, as reflected e.g., in 3GPP TR 38.801 v1.0.0 incorporated herein by reference in its entirety. A non-centralized deployment scenario (section 5.2 of TR 38.801) is presented therein, where base stations supporting the 5G NR can be deployed. FIG. 1 illustrates an exemplary non-centralized deployment scenario and is based on FIG. 5.2-1 of TR 38.301, while additionally illustrating an LTE eNB as well as a user equipment (UE) that is connected to both a gNB and an LTE eNB (which is to be understood as an eNB according to previous 3GPP standard releases such as for LTE and LTE-A).

An eLTE eNB, as exemplarily defined in TR 38.801, is the evolution of an eNB that supports connectivity to the EPC (Evolved Packet Core) and the NGC (Next Generation Core).

The RAN architecture may support tight interworking between the new RAT and LTE. In said context, multi-connectivity between LTE and the new radio access technology NR 5G may be supported, and can be based on the concept of dual connectivity (already known from previous 3GPP releases for LTE and LTE-A, explained in brief later). Multi-connectivity can be defined as a mode of operation where a multiple-Rx/Tx UE in the Connected Mode is configured to utilize radio resources amongst E-UTRA and NR provided by multiple distinct schedulers (e.g., LTE eNB and gNB) connected via a non-ideal backhaul link. Multi-connectivity can allow the UE to be at the same time connected to an LTE(-A) network and a new 5G network (exemplarily termed LTE-NR multi-connectivity).

Following the already-known concept of dual connectivity, the LTE-(A) eNB may be considered to be the master eNB (MeNB) while the new eNB for 5G (exemplarily called gNB) may be considered to be the secondary eNB (SeNB). Alternatively, the LTE eNB can be the SeNB, and the gNB can be the MeNB within the multi-connectivity scenario. It should be however also noted that NR-NR multi-connectivity can also be supported, where both the MeNB and the SeNB are gNBs.

Figure 2:
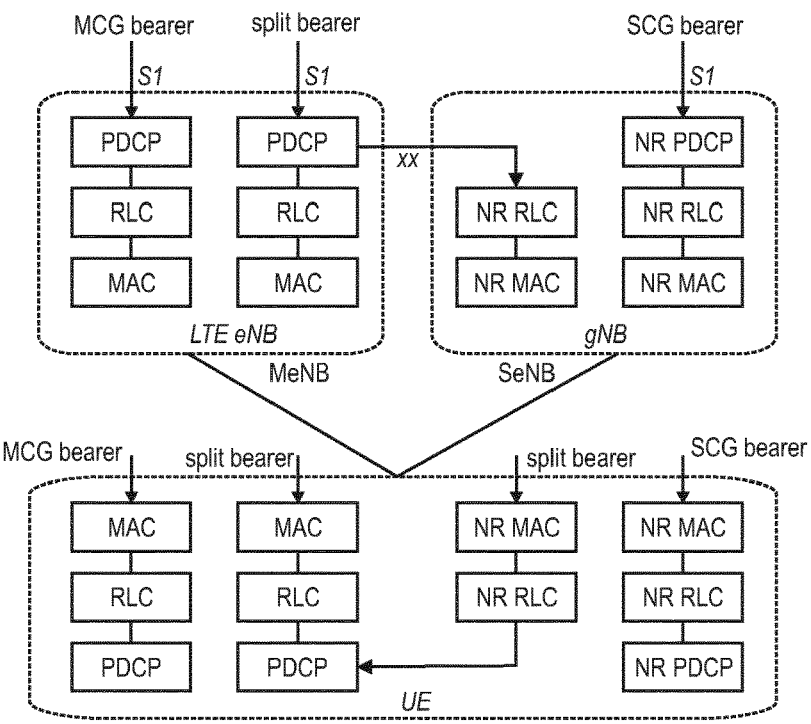
FIG. 2 shows an exemplary user plane architecture for the LTE eNB, gNB, and UE.

FIG. 2 illustrates an exemplary and general user plane architecture currently discussed in connection with LTE-NR multi-connectivity with an MCG (Master Cell Group) bearer via the LTE eNB, a bearer which is split between the LTE eNB and the gNB, and an SCG (Secondary Cell Group) bearer via the gNB (see e.g., 3GPP TS 38.801 section 10.1 incorporated herein by reference). It also illustrates the exemplary user plane architecture for the UE showing the various layers in the UE for handling data packets received via the bearers from the LTE eNB and the gNB.

The new NR layers exemplarily assumed at present for the 5G systems may be based on the user plane layer structure currently used in LTE(-A) communication systems, for simplicity and explanatory purposes. The different layers are thus termed NR MAC layer, NR RLC layer, and NR PDCP layer, allowing to correspond them to the commonly-known LTE layers (MAC, RLC, and PDCP) while indicating that the NR layers, although based on the LTE layers, could be different therefrom. However, it should be noted that no final agreements have been reached at present for the NR layers.

Figure 3:
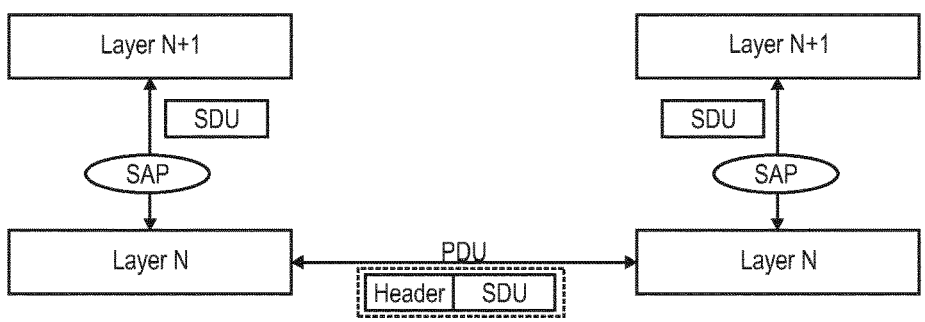
FIG. 3 illustrates the relationship of a protocol data unit (PDU) and a service data unit (SDU) as well as the inter-layer exchange of same, FIG. 4 gives an overview of the different functions in the PDCP, RLC and MAC layers as well as illustrates exemplary the processing of SDUs/PDUs by the various layers.

The terms service data unit (SDU) and protocol data unit (PDU) as used in the following herein will be explained in connection with FIG. 3. In order to formally describe in a generic way the exchange of packets between layers in the OSI model (such as the above mentioned MAC, RLC, and PDCP), SDU and PDU entities have been introduced. An SDU is a unit of information (data/information block) transmitted from a protocol at the layer N+1 that requests a service from a protocol located at layer N via a so-called service access point (SAP). A PDU is a unit of information exchanged between peer processes at the transmitter and at the receiver of the same protocol located at the same layer N.

A PDU is generally formed by a payload part consisting of the processed version of the received SDU(s) preceded by a layer-N specific header and optionally terminated by a trailer. Since there is no direct physical connection (except for Layer 1) between these peer processes, a PDU is forwarded to the layer-N−1 for processing. Therefore, a layer N PDU is from a layer-N−1 point of view an SDU.

As illustrated in FIG. 2, the LTE layer 2 user-plane protocol stack is composed of three sublayer PDCP, RLC and MAC. A further layer although not illustrated in FIG. 2, is the LTE layer 1, the physical layer. FIG. 4 exemplary depicts the data flow of an IP packet through the link-layer protocols down to the physical layer. The figure shows that each protocol sublayer adds its own protocol header to the data units.

At the transmitting side, each layer receives an SDU from a higher layer for which the layer provides a service and outputs a PDU to the layer below. The RLC layer receives packets from the PDCP layer. These packets may be called PDCP PDUs from a PDCP point of view and represent RLC SDUs from an RLC point of view. The RLC layer creates packets which are provided to the layer below, i.e., the MAC layer. The packets provided by RLC to the MAC layer are RLC PDUs from an RLC point of view and MAC SDUs from a MAC point of view. At the receiving side, the process is reversed, with each layer passing SDUs up to the layer above, where they are received as PDUs.

The physical layer essentially provides a bitpipe, protected by turbo-coding and a cyclic redundancy check (CRC). The link-layer protocols (MAC, RLC, and PDCP) enhance the service to upper layers by increased reliability, security and integrity. In addition, the link layer is responsible for the multi-user medium access and scheduling. The Packet Data Convergence Protocol (PDCP) sublayer is responsible mainly for IP header compression and ciphering. In addition, it supports lossless mobility in case of inter-eNB handovers and provides integrity protection to higher-layer control protocols. The radio link control (RLC) sublayer comprises mainly ARQ functionality and supports data segmentation and concatenation. The latter two minimize the protocol overhead independently of the data rate. Finally, the medium access control (MAC) sublayer provides HARQ (hybrid automatic repeat request) and is responsible for the functionality that is required for medium access, such as scheduling operation and random access.

The Layer-2 sub-layers will be explained in more detail below.

In LTE systems, the PDCP layer processes Radio Resource Control (RRC) messages in the control plane and IP packets in the user plane. Depending on the radio bearer, the main functions of the PDCP layer are:

header compression and decompression for user plane data

Security functions:
Ciphering and deciphering for user plane and control plane data
Integrity protection and verification for control plane data Handover support functions:
In-sequence delivery and reordering of PDUs for the layer above at handover;
Lossless handover for user plane data mapped on RLC Acknowledged Mode (AM)

Discard for user plane data due to timeout.

The PDCP layer manages data streams in the user plane, as well as in the control plane. Two different types of PDCP PDUs are defined in LTE: PDCP Data PDUs and PDCP Control PDUs. PDCP Data PDUs are used for both control and user plane data. PDCP Control PDUs may be used to transport the feedback information for header compression, and for PDCP status reports which are used in case of handover and hence are only used within the user plane.

PDCP Control PDUs, the format of which is exemplarily illustrated in FIG. 5, are used by PDCP entities handling user plane data. There are two types of PDCP Control PDUs, distinguished by the PDU Type field in the PDCP header. PDCP Control PDUs carry either PDCP "Status Reports" for the case of lossless handover, or ROHC (robust header compression) feedback created by the ROHC header compression protocol. PDCP Control PDUs carrying ROHC feedback are used for user plane radio bearers mapped on either RLC UM or RLC AM, while PDCP control PDUs carrying PDCP Status Reports are used only for user plane radio bearers mapped on RLC AM.

A PDCP Control PDU carrying a PDCP Status Report for the case of lossless handover is used to prevent the retransmission of already-correctly-received PDCP SDUs and also to request retransmission of PDCP SDUs which were correctly received but for which header decompression failed.

The PDCP layer as currently defined for LTE cellular systems is specified in the 3GPP Technical Standard TS 36.323 v14.0.0, incorporated herein by reference.

The RLC layer is located between the PDCP layer (the "upper" layer, from RLC perspective) and the MAC layer (the "lower" layer, from RLC perspective). It communicates with the PDCP layer through a Service Access Point (SAP) and with the MAC layer via logical channels. The RLC layer reformats PDCP PDUs (i.e., RLC SDUs) in order to fit them into the size indicated by the MAC layer; i.e., the RLC transmitter segments and/or concatenates the PDCP PDUs, and the RLC receiver reassembles the RLC PDUs to reconstruct the PDCP PDUs. In addition, the RLC reorders the RLC PDUs if they are received out of sequence due to the HARQ operation performed in the MAC layer.

The functions of the RLC layer are performed by "RLC entities". An RLC entity is configured in one of three data transmission modes: Transparent Mode (TM), Unacknowledged Mode (UM) and Acknowledged Mode (AM). In AM, special functions are defined to support retransmission, one of which consists of a RLC status report which is used by the RLC AM receiving entity to provide positive and/or negative acknowledgements of RLC PDUs (or portions of them) as feedback to the peer RLC AM transmitting entity.

The RLC layer as currently defined for LTE cellular systems is specified in the 3GPP Technical Standard TS 36.322 v13.2.0, incorporated herein by reference. The status reporting of the RLC layer is described for instance in section 5.2.3 of TS 36.322, and the STATUS PDU is explained in detail in section 6.2.1.6 of TS 36.322.

Further agreements have been reached during the last 3GPP meeting RAN2 #96 with regard to functionalities of the RLC (Radio Link Control) and PDCP (Packet Data Convergence Protocol) reordering for the 5G NR. In particular, it was agreed that out-of-order deciphering of PDCP PDUs should not be prohibited. The NR PDCP layer may support the re-ordering functionality (T-reordering). The NR RLC AM (Acknowledged Mode) may support T-reordering-like functionality for the purposes of determining the content of the RLC status report. The NR RLC reassembles RLC SDUs (Service Data Units) and delivers them to upper layers in the order they are received.

As mentioned, multi-connectivity for the interworking of LTE networks and 5G NR networks can be based on the concept of dual connectivity as known from LTE. The so-called "dual connectivity" concept in LTE refers to a mode of operation of a UE (in RRC_CONNECTED state), configured with a Master Cell Group (MCG) and a Secondary Cell Group (SCG). Dual connectivity is mainly defined in the 3GPP technical standard TS 36.300, v14.1.0, incorporated herein by reference, e.g., sections 4.9, 6.5, 7.6, 10.1.2.3.4, 10.1.2.8, and Annex M thereof. MCG is a term used in connection with dual connectivity and may be understood as a group of serving cells associated with the MeNB, comprising a PCell and optionally one or more SCells. SCG may be understood as a group of serving cells associated with the SeNB, comprising PSCell and optionally one or more SCells. An MCG bearer is a bearer whose radio protocols are only located in the MeNB to use MeNB resources only. An SCG bearer is a bearer whose radio protocols are only located in the SeNB to use SeNB resources. A split bearer is a bearer whose radio protocols are located in both the MeNB and the SeNB to use both MeNB and SeNB resources.

Figure 6:
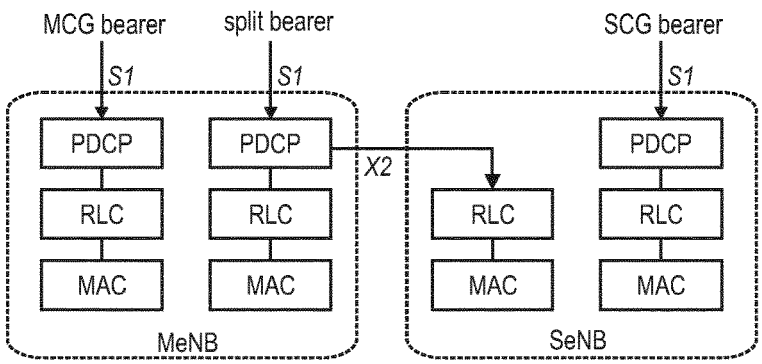
FIG. 6 illustrates the user plane architecture for the MeNB and SeNB for dual connectivity.

E-UTRAN (LTE) supports Dual Connectivity (DC) operation whereby a multiple Rx/Tx UE in RRC_CONNECTED is configured to utilize radio resources provided by two distinct schedulers, located in two eNBs connected via a non-ideal backhaul over the X2 interface. eNBs involved in DC for a certain UE may assume two different roles: an eNB may either act as an MeNB or as an SeNB. In DC a UE is connected to at least one MeNB and one SeNB, and the radio protocol architecture that a particular bearer uses depends on how the bearer is setup. Three bearer types exist: MCG bearer, SCG bearer and split bearer. Those bearer types are illustrated in FIG. 6. Inter-eNB control plane signaling for DC is performed by means of X2 interface signaling. Control plane signaling towards the MME is performed by means of S1 interface signaling.

Figures 7, 8:
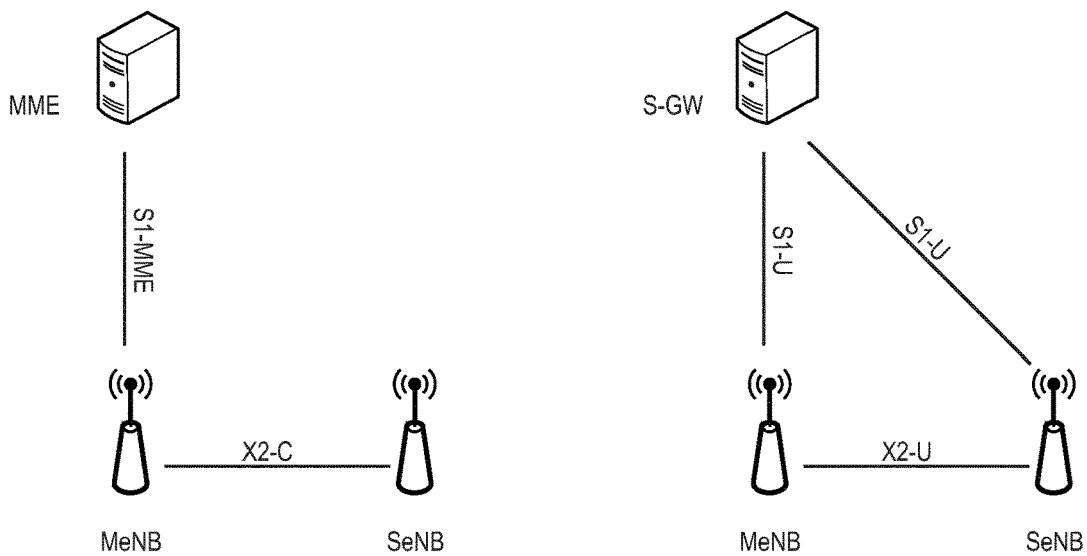
FIG. 7 illustrates the control plane connectivity of the MeNB and SeNB for a certain UE in dual connectivity.
FIG. 8 illustrates the user plane connectivity of the MeNB and the SeNB for a certain UE in dual connectivity.

There is only one S1-MME connection per DC UE between the MeNB and the MME. Each eNB should be able to handle UEs independently, i.e., provide the PCell to some UEs while providing SCell(s) for SCG to others. Each eNB involved in DC for a certain UE controls its radio resources and is primarily responsible for allocating radio resources of its cells. Respective coordination between MeNB and SeNB is performed by means of X2 interface signaling. FIG. 7 shows the Control-Plane connectivity of eNBs involved in DC for a certain UE: the S1-MME is terminated in MeNB and the MeNB and the SeNB are interconnected via X2-C.

For dual connectivity two different user plane architectures are allowed: one in which the S1-U only terminates in the MeNB and the user plane data is transferred from MeNB to SeNB using the X2-U, and a second architecture where the S1-U can terminate in the SeNB. FIG. 8 shows different U-plane connectivity options of eNBs involved in DC for a certain UE. For MCG bearers, the S1-U connection for the corresponding bearer(s) to the S-GW is terminated in the MeNB. The SeNB is not involved in the transport of user plane data for this type of bearer(s) over the Uu. For split bearers, the S1-U connection to the S-GW is terminated in the MeNB. PDCP data is transferred between the MeNB and the SeNB via X2-U. The SeNB and MeNB are involved in transmitting data of this bearer type over the Uu. For SCG bearers, the SeNB is directly connected with the S-GW via S1-U. The MeNB is not involved in the transport of user plane data for this type of bearer(s) over the Uu.

In case of DC, the UE is configured with two MAC entities: one MAC entity for MeNB and one MAC entity for SeNB.

Figure 9:
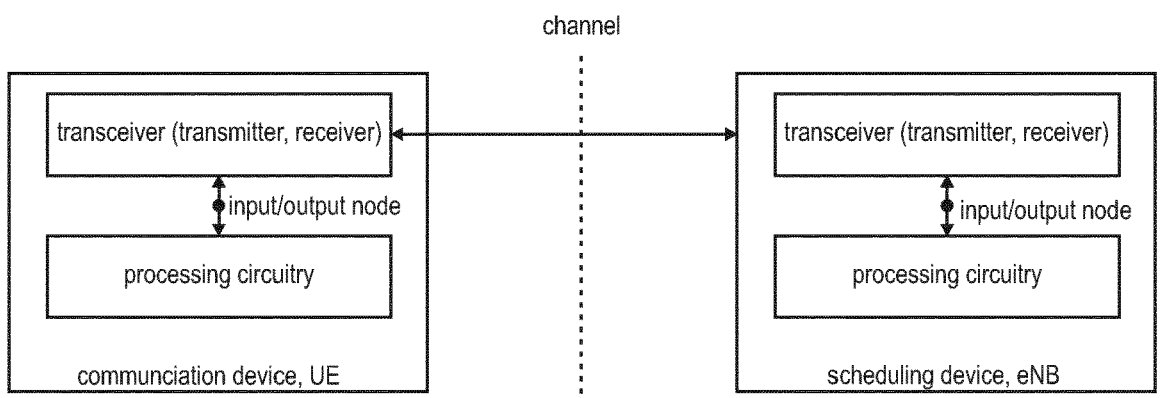
FIG. 9 illustrates the exemplary and simplified structure of a UE and an eNB (be it the LTE eNB or gNB), FIG. 10, 11, 12 are simplified and exemplary flow diagrams for a UE behavior according to various solutions of the present disclosure.

FIG. 9 illustrates a general, simplified and exemplary block diagram of a user equipment (also termed communication device) and a scheduling device (here assumed to be located in the base station, e.g., the LTE eNB and gNB). The UE and eNB are communicating with each other over a (wireless) physical channel respectively using the transceiver.

The communication device may comprise a transceiver and processing circuitry. The transceiver in turn may comprise a receiver and a transmitter. The processing circuitry may be one or more pieces of hardware such as one or more processors or any LSIs. Between the transceiver and the processing circuitry there is an input/output point (or node) over which the processing circuitry, when in operation, can control the transceiver, i.e., control the receiver and/or the transmitter and exchange received/transmitted data. The transceiver may include the RF front including one or more antennas, amplifiers, RF modulator/demodulator and the like. The processing circuitry may implement control tasks such a controlling the transceiver to transmit user data and control data provided by the processing circuitry and/or receive user data and control data which is further processed by the processing circuitry.

The new radio technology for the 5G cellular systems also works on a high frequency bands (even up to 100 GHz), which are more susceptible to noise and errors. Therefore, the users may experience bad channel conditions for prolonged periods of time which may increase the packet loss probability. This can have various disadvantages. For instance, the gNB, more particularly the NR RLC layer therein, may not always receive the RLC status reports, and thus the corresponding feedback from the NR gNB to the LTE eNB (via the backhaul link) is missing or at least delayed as well. Moreover, packet loss causes a delay in the PDCP reordering process, since PDCP PDUs that are received out of sequence are stored in the reordering buffer until they become in-sequence. The radio resources are used inefficiently and energy is wasted, since more retransmissions of the PDCP PDUs are needed The present disclosure thus shall present solutions facilitating to overcome one or more of the disadvantages mentioned above.

Detailed Description of Present Disclosure

In the following, UEs, base stations, and procedures will be described for the new radio access technology envisioned for the 5G mobile communication systems. Different implementations and variants will be explained as well. The following detailed disclosure is based on the previous section "Basis of the present disclosure".

In general, it should be however noted that only very few things have been actually agreed on with regard to the 5G cellular communication system such that many assumptions have to be made in the following so as to be able to explain the principles underlying the present disclosure. These assumptions are however to be understood as merely examples that should not limit the scope of the disclosure. A skilled person will be aware that the principles of the present disclosure and as laid out in the claims can be applied to different scenarios and in ways that are not explicitly described herein.

Moreover, terms used in the following are closely related to LTE/LTE-A systems, even though specific terminology to be used in the context of the new radio access technology for the next 3GPP 5G communication systems is not fully decided yet. Consequently, a skilled person is aware that the disclosure and its scope of protection should not be restricted to particular terms exemplary used herein for lack of newer terminology but should be more broadly understood in terms of functions and concepts that underlie the functioning and principles of the present disclosure.

For instance, a mobile station or mobile node or user terminal or user equipment (UE) is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" here refers to a physical entity within a communication network. The physical entity performs some control tasks with respect to the communication device, including one or more of scheduling and configuration. It is notes that the base station functionality and the communication device functionality may be also integrated within a single device. For instance, a mobile terminal may implement also functionality of a base station for other terminals.

A simple and exemplary scenario is assumed as illustrated in FIG. 1, where a UE is connected to both an LTE eNB and to a gNB and exchanges data packets with the two base stations, e.g., via corresponding radio links respectively between the UE and each base station. In other words, an LTE-NR multi-connectivity scenario is exemplarily assumed, reusing e.g., the concept of dual connectivity as explained before. A further exemplary assumption is that the LTE eNB is the MeNB, while the gNB takes the role of the SeNB. Although for the following explanations the above-described scenario of FIG. 1 is mainly used, it should be noted that the present disclosure is also applicable to other multi-connectivity scenarios, such as for NR-NR multi-connectivity or for NR-LTE connectivity where the LTE eNB is the SeNB and the gNB takes the role of the MeNB.

In any case, it is further exemplarily assumed that data is transmitted from both base stations (LTE eNB, gNB) to the UE, e.g., as illustrated in FIG. 2 using the MCG bearer, the split bearer, and the SCG bearer. It is exemplarily assumed in the following that the data is transmitted as data packets (more particularly as PDCP PDUs), following common concepts already known from other LTE(-A) cellular communication systems. This can be done e.g., by using the transceiver, receiver, and/or transmitter illustrated in FIG. 9 and explained above in more detail. For the bearer which is split at the PDCP layer, the LTE eNB forwards data (at the PDCP layer in form of PDCP PDUs to the lower RLC layer either at the LTE eNB or the gNB.

The present disclosure provides procedures as well as the participating entities (e.g., UE, LTE eNB, gNB) in order to improve the data provision between the base stations (LTE eNB, gNB) and the UE. To said end, the UE can determine via which at least one radio link the PDCP PDUs should be forwarded from the two base stations to the UE, and correspondingly instructs the responsible base station (e.g., in the scenario of FIG. 2 the LTE eNB) to change how the data packets are forwarded. The base station being responsible for how the data packets are forwarded to the UE, can be exemplarily called master base station, following the terms used for dual connectivity.

For instance, as apparent for the split bearer in FIG. 2, data packets of said bearer (particularly at the PDCP layer, the PDCP PDUs) are being forwarded to the UE via both radio links, namely via the radio link connecting the UE with the LTE eNB and via the radio link connecting the UE with the gNB. The LTE eNB is exemplarily assumed to control the forwarding of data packets of the split bearer, and may additionally be assumed to control the use of the gNB as SeNB. The LTE eNB correspondingly receives the data packets of said bearer via the S1 interface e.g. from the core network (be it an EPC or an NGC). This bearer is then split at the PDCP layer of the LTE eNB, with one bearer leg going via the gNB and the other bearer leg going via the LTE eNB.

Correspondingly, the data packets can either be forwarded via one of the two radio links only (either the LTE radio link between the LTE eNB and UE or the NR radio link between the gNB and the UE), or via both radio links. In case of using both radio links, the data packet forwarding may be distributed between the two radio links, e.g., according to a particular ratio (e.g., 60% via LTE radio link, 40% via NR radio link, or any other suitable ratio). Alternatively, each (or only some specific data packets) of the data packets can be transmitted via both radio links, thereby duplicating the data packets, such that the UE receives the same data packet via both routes. The UE can thus determine any of these forwarding options to be instructed to the LTE eNB. This may, if necessary, include information about a sharing ratio or the duplication of data packets when forwarding is to be performed over both radio links.

Subsequently, the UE may generate a corresponding message (exemplarily termed in the following radio link selection message) including information on the determined at least one radio link (the determined forwarding option) to the LTE eNB. Correspondingly, the UE, using e.g., the transceiver, may transmit the radio link selection message to the LTE eNB.

One exemplary option on how to transmit the radio link selection message is to use the MAC (Medium Access Control) layer. For instance, a dedicated uplink MAC control element (MAC CE) can be defined for carrying the relevant information of the radio link selection message. Such a dedicated uplink MAC CE could have one octet, where a 5-bit LC-ID field could be used to identify the MAC CE as a radio link selection message, while the remaining 3 bits can be used to indicate the determined forwarding option as will be discussed in detail later. Using MAC CE to transmit the radio link selection message can have the advantage that the information is soon available at the LTE eNB, e.g., when compared to the delay involved when using PDCP procedures in said respect. Another possible advantage is that only few bits are necessary to transmit the radio link selection message.

In addition or alternatively, the information of the radio link selection message can be transmitted within an MAC CE transmitted already for another reason, such that the information of the forwarding option to be used by the LTE eNB can be piggybacked. This may have the advantage that no dedicated MAC CE has to be defined for the purpose of carrying the radio link selection message.

A further option on how to transmit the radio link selection message is to use a PDCP control PDU, exemplarily consisting of an octet with a 1-bit D/C field (e.g., 0 indicating that it is a Control PDU and 1 indicating that it is a Data PDU), a 3-bit PDU type field (e.g., using any of the bits 011-111, in currently standard specifications deemed reserved, to identify the PDCP control PDU as a radio link selection message), while the remaining 4 bits can be used to indicate the determined forwarding option (similar to using 3 bits as will be discussed later).

There are various options on the content of the radio link selection message. It may for instance include a suitable identification of the determined radio link(s), possibly additionally including information on a ratio to be applied or a suitable instruction to duplicate (some or all) data packets when forwarding data packets over both radio links. The radio link identifications could for instance be assigned by the LTE eNB and then provided to the UE. Alternatively, radio link identifications may already be known to the base stations as well as to the UE in advance (e.g., could be defined by a corresponding standard specification).

In another exemplary implementation, the various forwarding options can be encoded e.g., by using 3 bits, that allow to distinguish between up to 8 different forwarding options (e.g., only LTE radio link, only NR radio link, LTE+NR radio links with ratio 20-80, LTE+NR radio links with ratio 40-60, LTE+NR radio links with ratio 50-50, LTE+NR radio links with ratio 60-40, LTE+NR radio links with ratio 80-20, LTE+NR radio links with duplicated data packets). By using code points, the determined forwarding option can be efficiently instructed to the LTE eNB, using less bits compared to another implementation where the radio link IDs are transmitted. It should be noted that also more or less bits can be foreseen so as to inform the LTE eNB on the determined forwarding option.

FIG. 10 is a simplified and exemplary flow diagram to illustrate the UE behavior according to one solution. As apparent therefrom, it illustrates the step that the UE determines the at least one radio link via which the data packets are to be forwarded by the responsible master base station (LTE eNB). Corresponding information on the determined at least one radio link is then transmitted by the UE to the master base station (e.g., the LTE eNB), such that the master base station may appropriately decide on whether and/or how the data forwarding can be changed based on the received instruction.

As already mentioned, the LTE eNB, receiving the radio link selection message from the UE, can then determine whether and/or how the currently used data forwarding can be changed. In one exemplary implementation, the radio link selection message can indeed be considered as a direct instruction for the LTE eNodeB to adapt the data forwarding as indicated by the UE in the radio link selection message, thereby not allowing the LTE eNodeB to deviate from the received instruction. Alternatively, the LTE eNodeB may also consider other information, in addition to the instructed forwarding option, when determining whether and/or how to adapt the data forwarding. For instance, channel measurements on one or both radio links can be additionally used by the LTE eNB to reach a decision. In particular, as explained in detail in later sections of this application, the UE may be configured to provide measurement reports and CQIs to the base stations as feedback information. Some or all of this feedback information can be considered by the LTE eNB upon receiving a radio link selection message, so as to then finally determine whether and/or how to adapt the data forwarding.

The solution thus provides a flexible and simple mechanism to adapt the data forwarding performed by the master base station (here the LTE eNB e.g., at the PDCP layer where the split bearer is split), e.g., depending on the channel conditions on the LTE radio link and/or the NR radio link. By adapting in a suitable manner the data forwarding when transmitting further PDCP PDUs, the overall packet loss probability can be reduced since e.g., bad channels can be avoided. As a result, the data, and particularly the PDCP PDUs, are more likely to be received in sequence, thus avoiding having to store PDCP PDUs in a buffer until they become in-sequence. The radio resources are more efficiently used, since the above-described radio link selection mechanism allows to adapt the data forwarding and thus to avoid transmittal of data at bad channel conditions. Feedback (such as an RLC status report) is more likely to be successfully transmitted, which in turn may allow the gNB in turn to deliver suitable feedback to the LTE eNB.

Further variants of the above disclosure revolve around the issue of when exactly the UE shall determine a forwarding option and instruct same to the LTE eNodeB. Generally, the determination of a (different) forwarding option can be performed whenever necessary. FIG. 11, which is an exemplary and simplified flow diagram of the UE behavior and is based on previous FIG. 10, correspondingly shows that the UE additionally checks whether the radio link selection shall be triggered or not.

What the best data forwarding option is may depend on the channel conditions of one or the two radio links, and the UE, according to one variant, can thus take the channel conditions into consideration to decide whether or not a different forwarding option is more suitable than the currently used one. Channel conditions on the radio link can be evaluated in different manners and using one or more suitable parameters, such as the reference signal received power, RSRP, the reference signal received quality, RSRQ, the signal to noise ratio, SNR, and possibly other parameters. The UE can thus perform suitable measurements (using one or more of the above discussed channel parameters) on one or both radio links so as to decide whether to determine a forwarding option or not. For instance, the UE can compare the measured radio link parameters with respectively suitable threshold values. For instance, if the channel quality on at least one radio link falls below a particular value (e.g., RSRP), the UE shall proceed to determine a (different) forwarding option and to instruct the LTE eNodeB accordingly to change the data forwarding. For instance, assuming that the channel conditions for the NR radio link worsen significantly (as evidenced e.g., by a drop in the measured RSRP or RSRQ or SNR), no further data packets should be transmitted over said NR radio link if possible, and rather the LTE eNB should forward the data packets via the LTE radio link (having supposedly better channel conditions).

In addition or alternatively, the UE can also compare the measured radio link parameters with respectively previously-measured radio link parameters, and if a substantial change in the channel conditions is determined thereby, the UE may proceed to determine a (different) forwarding option and to instruct the LTE eNodeB accordingly to change the data forwarding.

FIG. 12, which is an exemplary and simplified flow diagram of the explained UE behavior, shows that the UE checks both conditions and proceeds to determine a suitable forwarding option when one of the two conditions is considered to be fulfilled (i.e., "Yes").

The above explanations focused on a split-bearer scenario, as illustrated in FIG. 2, where a bearer is split at the PDCP layer of the LTE eNB, which in turn is thus responsible to decide how to forward the data (PDCP PDUs) of the split bearer. However, the above disclosure is not limited to such a split-bearer scenario, but can be also advantageously used in a non-split-bearer scenario, i.e., with regard to data provision using different and separate bearers, such as the MCG bearer and SCG bearer illustrated in FIG. 2. It is here exemplarily assumed that the master base station to some extent controls the configuration of the secondary base station. Correspondingly, when the master base station receives the radio link selection message from the UE, it may deduce that there is a problematic situation and may, based thereon, reconfigure certain bearers. For instance, assuming a worsening of the NR radio link, the master base station may add/modify/remove the SeNB as appropriate. This may e.g., include that the SCG bearer is reconfigured so as to no longer go via the secondary base station but instead via the master base station.

In the following, further procedures as well as the participating entities (e.g., UE, LTE eNB, and gNB) are presented to improve the data provision. The same exemplary scenarios already explained before in connection with FIGS. 1 and 2 can be assumed for the following solutions too. In brief, an LTE-NR multi-connectivity scenario is mainly assumed where a UE is connected to both an LTE eNB and a gNB and exchanges data packets with the two base stations. Exemplarily, the LTE eNB is the master base station (MeNB), and the gNB is the secondary base station (SeNB). As apparent from FIG. 2, two separate bearers and a bearer split at the PDCP layer of the LTE eNB are assumed to carry data. Correspondingly, the LTE eNB is responsible for controlling the data forwarding corresponding to the split bearer via the LTE radio link and/or the NR radio link.

In this solution, instead of deciding on its own (as in the previous solution), the UE can assist the master base station (i.e., the base station responsible for controlling the data forwarding; in the example scenario of FIG. 2, the LTE eNB) to determine whether and/or how to change the data forwarding for the split bearer. In order to assist the LTE eNB, the UE can transmits suitable channel information to the LTE eNB, such that the LTE eNB can use said information to decide how to route data packets (PDCP PDUs). This procedure is illustrated in FIG. 13, which is a simplified and exemplary flow diagram of a UE behavior according to this solution.

So as to obtain channel information about both radio links (the LTE radio link to the LTE eNB and the NR radio link to the gNB), the UE may perform suitable measurements on those radio links. In one variant, the UE may perform the same or similar measurements as discussed before for previous solutions, i.e., the channel conditions on the radio links can be evaluated using one or more suitable parameters, such as the reference signal received power, RSRP, the reference signal received quality, RSRQ, the signal to noise ratio, SNR, and possibly other parameters.

Alternatively, the UE can reuse procedures already known from previous LTE specifications so as to measure and report channel conditions to the LTE eNodeB. In particular, the parameter CQI (channel quality indicator; also termed channel state information, CSI, or channel quality information) gives information on the quality of the signal received by a UE. In LTE, the UE can be configured to report CQIs to assist the eNodeB in selecting an appropriate modulation and coding scheme to use for the downlink transmissions. The CQI reports are derived from the downlink received signal quality, typically based on measurements of the downlink reference signals. It should be noted that the reported CQI is not a direct indication of the SINR (Signal-to-Interference plus Noise Ratio). Instead, using the CQI, the UE reports the highest modulation and coding scheme that it can decode with a BLER (Block Error Rate) probability not exceeding 10%. Therefore, the CQI information takes into account the characteristics of the UE receiver, and not just the radio channel quality. The periodicity and frequency resolution to be used by a UE to report CQI may both be controlled by the eNodeB. Different CQI index values indicate different combinations of modulation schemes and coding rates. More details on the CSI (CQI) according to LTE are given e.g., in the 3GGP Technical Standard TS 36.213 v14.1.0 (also in previous versions), section 7.2.0, incorporated herein by reference in its entirety.

In addition or alternatively, the UE can transmit so-called measurement reports to the master base station, the measurement reports being already known from LTE systems, as will be explained in the following. As defined in the 3GPP Technical Standard TS 36.331 V 14.0.0, section 5.5 incorporated herein by reference in its entirety, in LTE the UE reports measurement information in accordance with the measurement configuration provided by E-UTRAN, and can be requested to perform at least one or more of the following types of measurements: intra-frequency measurements for the E-UTRA, inter-frequency measurements for the E-UTRA, inter-RAT measurements (of UTRA frequencies, of GERAN frequencies, of CDMA2000 1×RTT or HRPD frequencies or WLAN frequencies). In the UE, the physical layer performs measurements and reports measured data to the RRC layer. Then, that measured data can be evaluated with regard to the reporting criteria that are configured by the measurement configuration so as to determine whether or not reporting should be triggered. Upon triggering of the reporting, the UE reports measurement results according to the measurement configuration. In brief, the measurement configuration defines the measurement objects (such as the set of frequencies or a set of cells), the reporting configurations (e.g., reporting criterion and reporting format), the measurement identities, the quantity configurations, and the measurement gaps. The above mentioned reporting format corresponds to the quantities that can be included in a measurement report such as the reference signal received power (RSRP), the reference signal received quality (RSRQ). Typically, the RSRP corresponds to the signal strength of the (E-UTRA) cell. The RSRQ comes from the ratio of the RSRP to the received signal strength indicator (RSSI). The RSSI is the received wideband power including interference, and therefore, the RSRQ is used as an additional metric to take into account interference in LTE. For inter-RAT measurements, the quantities are the received signal code power (RSCP), which is comparable to the RSRP, and the Ec/no for the UTRA, and the RSSI for the GERAN, For more detailed information, reference is made to the TS 36.331 section 5.5 mentioned above.

As presented, channel information about both radio links can thus be obtained by the UE in various manners. The collected information may then be transmitted by the UE to the LTE eNodeB. FIGS. 14 and 15 illustrate two exemplary options on how to transmit the CQI information and the measurement reports from the UE to the LTE eNB. In one option, the UE transmits also the channel information regarding the gNB (in the figure CQI gNB) directly to the LTE eNB, instead of transmitting same to the gNB for then being forwarded by the gNB to the LTE eNB. Optionally, the UE may or may not also provide the CQI gNB feedback to the gNB in the usual manner, provided the gNB would need this information for normal operation.

The UE may use the RRC layer to transmit the necessary channel information regarding the two radio links to the LTE eNB. For instance, the UE may use a RRC Connection Reconfiguration message, or an RRC Connection Setup message, as currently defined in the RRC specification TS 36.331 v14.0.0, sections 5.3.3 and 5.3.5.

Thus, as can be seen from the two figures, the LTE eNB is provided with channel information on both radio links and can use same to determine a suitable forwarding option. As discussed already before, the data packets can either be forwarded via one of the two radio links only (either the LTE radio link between the LTE eNB and UE or the NR radio link between the gNB and the UE), or via both radio links. In case of using both radio links, the data packets to be forwarded may be distributed between the two radio links, e.g., according to a particular ratio (e.g., 60% via LTE radio link, 40% via NR radio link, or any other suitable ratio). Alternatively, each (or only some specific data packets) of the data packets can be transmitted via both radio links, thereby duplicating the data packets, such that the UE receives the same data packet via both routes. The LTE eNB can thus determine any of these forwarding options for handling newly arriving data for being forwarded to the UE.

The solution, in a similar manner as the above-discussed UE-controlled radio link selection, provides a flexible and simple mechanism to adapt the data forwarding performed by the LTE eNB (e.g., at the PDCP layer where the split bearer is split), e.g., depending on the channel conditions on the LTE radio link and/or the NR radio link. By adapting in a suitable manner the data forwarding for newly arriving data, the overall packet loss probability can be reduced since e.g., bad channels can be avoided, which results in a more robust transmission of the PDCP PDUs, a more efficient utilization of radio resources, and feedback information (such as an RLC status report) to be more likely successfully transmitted.

The above explanations focused on a split-bearer scenario, as illustrated in FIG. 2, where a bearer is split at the PDCP layer of the LTE eNB, which in turn is thus responsible to decide how to forward the data (PDCP PDUs) of the split bearer. However, the above disclosure is not limited to such a split-bearer scenario, but can be also advantageously used in a non-split-bearer scenario, i.e., with regard to data provision using different and separate bearers, such as the MCG bearer and SCG bearer illustrated in FIG. 2. It is here exemplarily assumed that the master base station to some extent controls the configuration of the secondary base station. Correspondingly, when the master base station receives the channel information on the two radio links from the UE, it may deduce that there is a problematic situation and may, based thereon, reconfigure certain bearers. For instance, assuming a worsening of the NR radio link, the master base station may add/modify/remove the SeNB as appropriate. This may e.g., include that the SCG bearer is reconfigured so as to no longer go via the secondary base station but instead via the master base station.

In the following, further procedures as well as the participating entities (e.g., UE, LTE eNB, and gNB) are presented to improve the data provision. This solution can be used as a standalone improvement or may be used in combination with the above-presented disclosures where the UE or LTE eNB determines a suitable forwarding option (see corresponding description in connection with FIG. 10-17). For instance, the radio link selection message can be transmitted together with the ACK status report message as explained below.

The same exemplary scenarios already explained before in connection with FIGS. 1 and 2 can be assumed for the following solution too. In brief, an LTE-NR multi-connectivity scenario is mainly assumed where a UE is connected to both an LTE eNB and a gNB and exchanges data packets with the two base stations. Exemplarily, the LTE eNB is the master base station (MeNB), and the gNB is the secondary base station (SeNB). As apparent from FIG. 2, two separate bearers and a bearer split at the PDCP layer of the LTE eNB are assumed to carry data. Correspondingly, the LTE eNB is responsible for controlling the data forwarding corresponding to the split bearer via the LTE radio link and/or the NR radio link.

In this solution, the UE provides additional feedback on the reception (ACK) status of PDCP PDUs of a split bearer received via both radio links (i.e., the LTE eNB and from the gNB) to the master base station (the LTE eNodeB). To said end, the UE operates a dedicated timer (exemplarily called in the following ACK status report timer), based on which the triggering of this additional feedback procedure is controlled by the UE. In more detail, the ACK status report timer can be seen as an additional timer of the PDCP layer, in addition to e.g., the T-reordering timer which is already known from PDCP operation in LTE cellular systems.

In brief, in LTE the PDCP T-reordering timer is started when the receiver (here e.g., the UE) has a sequence number (SN) gap, and thus can be used to detect loss of PDCP PDUs. The T-reordering timer is stopped when the missing PDU is received and, then, the receiving window is moved forward. If the T-reordering timer expires but the missing SN PDCP PDU was not received, the receiver window is moved forward until the last PDU submitted to higher layers, or until the next missing PDU. More details regarding the PDCP layer and especially the operation of the T-reordering timer can be found in the 3GPP technical standard TS 36.323, incorporated herein by reference, e.g., section 7.2 b) "t-Reordering", section 5.1.2.1.4 "Procedures for DRBs mapped on RLC AM and for LWA bearers when the reordering function is used".

The new ACK status report timer defined for the PDCP layer can be started for example at the same time as the T-reordering timer, i.e., when the UE determines a sequence number gap, where a PDCP PDU was received out of sequence. A trigger event for the new ACK status report timer may be for instance the start of the T-reordering timer. In addition, or alternatively, one or more trigger events may be the same or similar to the trigger events as already defined for the LTE T-reordering timer (see e.g., sub-sections of 5.1.2.1.4 of TS 36.323).

Additional trigger events can be defined for triggering the ACK status report timer. For instance, the feedback of the ACK status report might be interesting for the LTE eNodeB when the channel conditions change significantly by at least a specific amount. Correspondingly, an ACK status report might be triggered based on measurements performed by the UE which allow the UE to determine that the channel conditions in the LTE radio link and/or NR radio link have changed by at least a specific amount.

The triggering of the ACK status report can also be dependent on the number of PDCP PDUs that are not received by the UE. Correspondingly, the ACK status report may be sent after the UE determines that a specific number of PDCP PDUs have not been received. One advantage that can be obtained thereby is that the ACK status report is transmitted less often, while efficiently providing feedback information for a minimum number of PDCP PDUs.

Another alternative or additional option is to make the triggering of the ACK status report dependent on the relevancy of the PDCP PDUs. For example, QoS information may be available at the UE for the PDCP PDUs, from which the relevancy of the PDCP PDUs can be derived. According to this option, the triggering of the ACK status report takes the PDCP PDU relevance into account so as to e.g., restrict the triggering to only PDCP PDUs which relevance is high enough (greater than a particular value). One advantage that can be obtained thereby is that the ACK status report is transmitted less often, while ensuring that the feedback information is available for PDCP PDUs of sufficiently high relevance.

The timer value for the new ACK status report timer may be chosen to be less than the timer value for the T-reordering timer. This can be advantageous because the UE may thus re-cover missing packets before the expiry of the T-reordering timer. Once T-reordering timer expires, more PDCP PDUs may be delivered to higher layer. The value of the ACK status report timer and the T-reordering timer can be configured e.g., by higher layer. For instance, where the T-reordering timer has a value of 40 ms, the ACK status report timer can take values e.g., of 20 ms.

Figure 18:
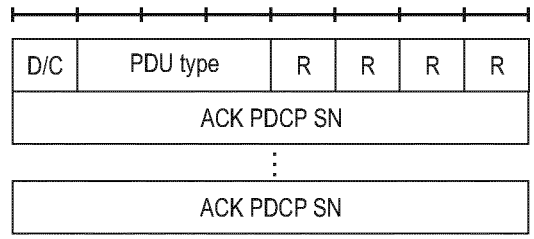
FIG. 18 shows an exemplary format of an ACK status report.

Upon expiry of the ACK status report timer, the UE generates a corresponding ACK status report by obtaining information on which PDCP PDUs have been received already successfully. The content of the ACK status report should thus appropriately be generated so as to allow the recipient, the LTE eNodeB, to derive those PDCP PDUs that have been received successfully at the UE already. According to one exemplary variant, the ACK status report may list the sequence numbers of those PDCP PDUs that have been received successfully in the UE. A suitable exemplary format for the ACK status report is illustrated in FIG. 18, where the 1-bit D/C field distinguishes between a control PDU and a data PDU, the 3-bit PDU type field shall identify same as an ACK status report, whereas one octet can be used for each sequence number of a PDCP PDU that has been successfully received by the UE. The successfully received PDCP PDUs may also be reported differently, e.g., by indicating the first and last in-sequence successfully received PDCP PDUs in addition to further out-of-sequence successfully received PDCP PDUs if any.

The LTE eNB, when receiving the ACK status report, can use said information in order to optimize the data forwarding of the PDCP PDUs of the split bearer. As already explained in the previous solutions, there are several forwarding options. The data packets can either be forwarded via one of the two radio links only (either the LTE radio link between the LTE eNB and UE or the NR radio link between the gNB and the UE), or via both radio links. In case of using both radio links, the data packet forwarding may be distributed between the two radio links, e.g., according to a particular ratio (e.g., 60% via LTE radio link, 40% via NR radio link, or any other suitable ratio). Alternatively, each (or only some specific data packets) of the data packets can be transmitted via both radio links, thereby duplicating the data packets, such that the UE receives the same data packet via both routes.

Moreover, the LTE eNodeB can use the information obtained from the ACK status report for the PDCP recovery, by identifying the PDCP PDUs that have not been successfully transmitted to the UE and controlling how these PDCP PDUs are again transmitted to the UE.

Thus, the LTE eNodeB can control the data forwarding for newly arriving PDCP PDUs as well as for PDCP PDUs that have not yet been successfully transmitted to the UE (as derived from the ACK status report).

An exemplary scenario is presented in FIG. 16 illustrating the downlink data provision of PDCP PDUs 1-10 to the UE. As apparent therefrom, it is exemplarily assumed that the downlink data provision is evenly distributed via both radio links (ratio 50-50), such that respectively 5 out of the 10 PDCP PDUs are transmitted via the two radio links. FIG. 16 further illustrates that the PDCP PDUs 4, 6, 8, 10, transmitted via the NR radio link are assumed to not be successfully transmitted e.g., due to strong interference on the NR radio link. The ACK status report timer can thus be triggered by the reception of the first out-of-sequence PDCP PDU with SN 5 (creating an SN gap), and upon expiry of the ACK status report timer (e.g., at a point in time where PDCP PDU with SN 9 is received), a corresponding ACK status report is transmitted by the UE directly to the LTE eNodeB as illustrated in FIG. 16. The ACK status report may e.g., indicate the successfully received PDCP PDUs 1, 2, 3, 5, 7, 9.

Using the information provided by the ACK status report, the LTE eNodeB can change the data provision such that the PDCP PDUs not yet successfully received by the UE (4, 6, 8, 10) as well as further newly arriving PDCP PDUs (here e.g., only PDCP PDU with SN 11) are transmitted via the LTE radio link only, so as to avoid further loss of PDCP PDUs when using the NR radio link. This is illustrated in FIG. 17.

As mentioned before (and as illustrated in FIGS. 16 and 17), the UE may also operate the T-reordering timer, which is started at basically the same time as the ACK status report timer. Upon expiry of the T-reordering timer, the UE may deliver the successfully received PDCP PDUs including holes (also the missing sequence numbers) to the higher layer(s).

Figure 19:
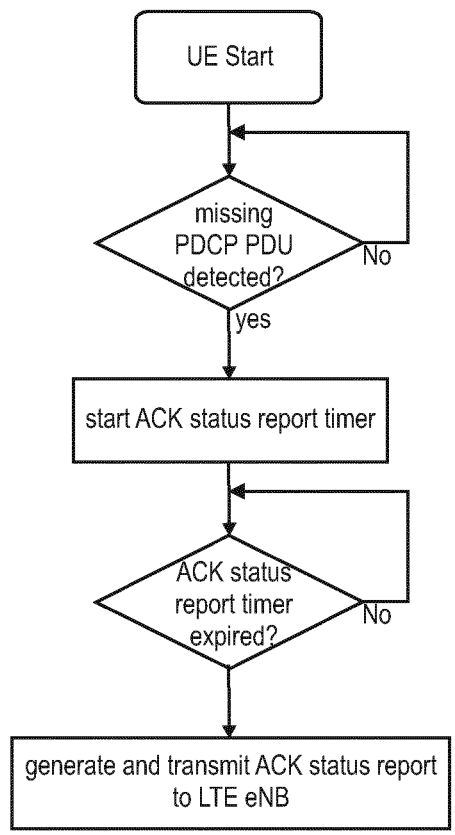
FIG. 19 is a simplified an exemplary flow diagram for a UE behavior according to one solution of the present disclosure.

FIG. 19 is a simplified and exemplary flow diagram for the UE behavior according to the above presented solution. Accordingly, the UE shall determine whether a PDCP PDU is missing and, in the positive case, start the ACK status report timer (and optionally also the T-reordering timer). Upon expiry of this ACK status report timer, the UE can generate and transmit the ACK status report to the LTE eNodeB as explained above.

In the following a specific scenario is assumed. In particular, the NR radio link can be operated according to a TDD (time division duplex). LTE TDD uses same frequency band for the uplink and downlink.

A MAC PHR is generally already known from LTE cellular systems (see e.g., 3GPP TS 36.321, v14.1.0 section 5.4.6, incorporated herein by reference) and is used to inform where the UE can transmit at a higher transmission power or not. Put briefly, the MAC PHR indicates how much relative transmission power is less than the UE. So a simple formula for Power Headroom in LTE is Power Headroom=UE Max Transmission Power−PUSCH Power=$P$max−$P$_pusch Thus, if Power Headroom is a positive value, that means the UE is still capable to send at a higher transmission power or it is capable of transmitting at higher throughput. If the value is negative, UE is already transmitting at maximum Tx power. In the positive Power Headroom case, network may allocate more resource blocks to the UE, but in the negative Power Headroom case it is assumed that UE is already using the maximum resource blocks and there is no need to assign more. The reported power headroom shall be estimated over 1 subframe. The power headroom shall be estimated only in a subframe where PUSCH is transmitted.

The MAC PHR can be sent e.g., 1.) when downlink pathloss threshold is reached (dl-PathlossChange) and 2) when periodicPHR-Timer is set, such that the UE sends periodically the Power Headroom Report to the network. The MAC PHR (Power Headroom Report) Control Element as exemplary presented and defined in the LTE specifications can be used to implicitly indicate the downlink NR radio link problem to the LTE eNB.

Based on PHR value calculated by UE, eNB will forward less and more data to the UE.

Further Aspects

According to a first aspect, a user equipment in a mobile communication system is provided. The UE comprises processing circuitry, which in operation, determines at least one radio link via which a first base station is to forward data packets to the user equipment. The user equipment is connectable to both the first base station via a first radio link and to a second base station via a second radio link. The UE further comprises a transmitter, which in operation, transmits a radio link selection message to the first base station. The radio link selection message comprises information on the determined at least one radio link for instructing the first base station via which at least one radio link to forward the data packets to the user equipment.

According to a second aspect which is provided in addition to the first aspect, the first radio link and the second radio link are based on different radio technologies. According to one option, the first radio link is based on the Long Term Evolution technology of the 3GPP, 3rd Generation Partnership Project or a new radio technology of the 5th Generation, 5G, of the 3GPP. Further optionally, the second radio link is based on the new radio technology of the 5th Generation, 5G, of the 3GPP.

According to a third aspect which is provided in addition to one of the first to second aspects, the processing circuitry, when in operation, measures parameters of the first radio link and/or the second radio link and compares the measured parameters with a threshold value. Further, the processing circuitry, when in operation, determines to transmit a radio link selection message based on the result of the comparison. In addition, or alternatively, the processing circuitry, when in operation, measures parameters of the first radio link and/or the second radio link and compares the measured parameters with previously measured parameters. The processing circuitry, when in operation, determines to transmit a radio link selection message based on the result of the comparison. Optionally, the parameters of the first radio link and of the second radio link comprise at least one of the following parameters:

reference signal received power, RSRP,
reference signal received quality, RSRQ,
Signal to Noise ratio, SNR.

According to a fourth aspect in addition to one of the first to third aspects, the transmitter, when in operation, transmits the radio link selection message within a Medium Access Control, MAC, Control Element.

According to a fifth aspect in addition to one of the first to fourth aspects, the processing circuitry, when in operation, determines that the first base station is to forward data packets either:

via the first radio link only, or
via the second radio link only, or
via both the first radio link and the second radio link.

In case the processing circuitry determined that the first base station is to forward data packets via both the first radio link and the second radio link, the processing circuitry, when in operation, further determines a ratio between data packets to be forwarded via the first radio link and via the second radio link, the ratio being included in the radio link selection message, or the processing circuitry, when in operation, further determines that the data packets are to be forwarded in duplicate via the first radio link and the second radio link, the radio link selection message comprising information on the duplication.

According to a sixth aspect in addition to one of the first to fifth aspects, a first radio link identity, assigned to the first radio link, is different from a second radio link identity, assigned to the second radio link. The information comprised in the radio link selection message on the at least one radio link comprises the first radio link identity and/or the second radio link identity. Optionally, a receiver of the user equipment, when in operation, receives the first radio link identity and/or the second radio link identity from the first base station.

According to the seventh aspect in addition to one of the first to sixth aspects, the user equipment is connectable to the first base station and the second base station using a split bearer, split between the first base station and the second base station. Optionally, a Packet Data Convergence Protocol, PDCP, layer of the user equipment is shared for the split bearer, and the data packets are PDCP protocol data units, PDCP PDUs. Alternatively, the user equipment is connectable to the first base station and the second base station separately via two bearers.

According to eighth aspect in addition to one of the first to seventh aspects, the processing circuitry, when in operation, operates a report timer to control a transmission of a reception report for a series of data packets received from the first base station and the second base station. The report timer is started when a first data packet in the series of data packets is detected as missing. Upon expiry of the report timer, the processing circuitry, when in operation, determines to transmit a reception report to the first base station and generates the reception report. The generated reception report indicates the data packets successfully received from the first base station and the second base station. The transmitter, when in operation, transmits the generated reception report to the first base station.

According to ninth aspect in addition to the eighth aspect, the processing circuitry, when in operation, further determines to transmit the reception report when the measured parameters of the first radio link and/or second radio link change by at least a specific amount compared to respective previously measured parameters. The processing circuitry, when in operation, determines to not transmit the reception report when the data packets to be reported via the reception report are of low relevance or when the number of data packets not successfully received is below a specific number.

According to tenth aspect in addition to the eighth or ninth aspect, the transmitter, when in operation, transmits the reception report together with the radio link selection message to the user equipment.

According to eleventh aspect, a method is provided for operating a user equipment in a mobile communication system. The method comprises the following steps performed by the user equipment. At least one radio link via which a first base station is to forward data packets to the user equipment is determined. The user equipment is connectable to both the first base station via a first radio link and to a second base station via a second radio link. A radio link selection message is transmitted to the first base station. The radio link selection message comprises information on the determined at least one radio link for instructing the first base station via which at least one radio link to forward the data packets to the user equipment.

According to a twelfth aspect in addition to the eleventh aspect, the method further comprises the following steps performed by the user equipment. A report timer is operated to control a transmission of a reception report for a series of data packets received from the first base station and the second base station. The report timer is started when a first data packet in the series of data packets is detected as missing. Upon expiry of the report timer, the UE determines to transmit a reception report to the first base station and generates the reception report. The reception report indicates the data packets successfully received from the first base station and the second base station. The generated reception report is then transmitted to the first base station.

According to a thirteenth aspect, a first base station in a mobile communication system is provided. A receiver of the first base station, when in operation, receives a radio link selection message from a user equipment. The user equipment is connectable to both the first base station via a first radio link and to a second base station via a second radio link. The radio link selection message comprises information on an at least one radio link via which the first base station is to forward data packets to the user equipment. Processing circuitry of the first base station, when in operation, determines at least one radio link via which to forward the data packets to the user equipment, based on the received radio link selection message. A transmitter of the first base station, when in operation, forwards the data packets via the determined at least one radio link to the user equipment.

According to a fourteenth aspect provided in addition to the thirteenth aspects, the receiver, when in operation, receives from the user equipment a reception report that indicates the data packets successfully received by the user equipment from the first base station and the second base station. The processing circuitry, when in operation, performs the determination of the at least one radio link via which to forward the data packets based on the received reception report. Optionally, the processing circuitry, when in operation, determines whether and via which radio link to transmit data packets not successfully received by the user equipment, based on the received reception report.

According to a fifteenth aspect, a user equipment in a mobile communication system provided. Processing circuitry of the user equipment, when in operation, generates radio link information on a first radio link and on a second radio link. The user equipment is connectable to both a first base station via the first radio link and to a second base station via the second radio link for exchanging data packets. A transmitter of the user equipment, when in operation, transmits the generated radio link information to the first base station to be used by the first base station for determining at least one radio link via which to forward the data packets to the user equipment.

According to a sixteenth aspect provided in addition to the fifteenth aspect, the first radio link and the second radio link are based on different radio technologies, optionally wherein the first radio link is based on the Long Term Evolution technology of the 3GPP, 3rd Generation Partnership Project or a new radio technology of the 5th Generation, 5G, of the 3GPP, and optionally wherein the second radio link is based on the new radio technology of the 5th Generation, 5G, of the 3GPP.

According to a seventeenth aspect provided in addition to the fifteenth or sixteenth aspect, the radio link information is transmitted in at least one Radio Resource Control, RRC, message.

According to an eighteenth aspect provided in addition to one of the fifteenth to seventeenth aspects, the radio link information comprises at least one of the following:
  Channel Quality Information, CQI,
  a measurement report, including channel condition parameters such as reference signal received power, RSRP, reference signal received According to a nineteenth aspect, a method for operating a user equipment in a mobile communication system is provided. The method comprises the following steps. Radio link information on a first radio link and on a second radio link is generated. The user equipment is connectable to both a first base station via the first radio link and to a second base station via the second radio link for exchanging data packets. The generated radio link information is transmitted to the first base station to be used by the first base station for determining at least one radio link via which to forward the data packets to the user equipment.

According to a twentieth aspect, a first base station in a mobile communication system is provided. A receiver of the first base station, when in operation, receives from the user equipment radio link information on a first radio link and on a second radio link. The user equipment is connected to both the first base station via the first radio link and to a second base station via the second radio link for exchanging data packets. Processing circuitry of the first base station, when in operation, determines at least one radio link via which the data packets are to be forwarded to the user equipment. A transmitter of the first base station, when in operation, forwards the data packets via the determined at least one radio link to the user equipment.

According to a twenty-first aspect provided in addition to the twentieth aspects, the processing circuitry, when in operation, determines that the first base station is to forward data packets either:
  via the first radio link only, or
  via the second radio link only, or
  via both the first radio link and the second radio link.

In case the processing circuitry determined that the first base station is to forward data packets via both the first radio link and the second radio link, the processing circuitry, when in operation, further determines a ratio between data packets to be forwarded via the first radio link and via the second radio link, or the processing circuitry, when in operation, further determines that the data packets are to be forwarded in duplicate via the first radio link and via the second radio link.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment in a mobile communication system, the user equipment comprising:

processing circuitry, which in operation, determines at least one radio link via which a first base station is to forward data packets to the user equipment, the user equipment being connectable to both the first base station via a first radio link and to a second base station via a second radio link; and a transmitter, which in operation, transmits a radio link selection message to the first base station, the radio link selection message comprising information on the determined at least one radio link for instructing the first base station via which at least one radio link to forward the data packets to the user equipment, wherein the processing circuitry, when in operation,
  starts a report timer in response to a first data packet, of a series of data packets, being detected as missing; and
  in response to the report timer expiring, determines to transmit a reception report to the first base station, and determines to refrain from transmitting the reception report in response to a number of data packets detected as missing being below a specific number.

2. The user equipment according to claim 1, wherein the first radio link and the second radio link are based on different radio technologies, wherein the first radio link is based on a Long Term Evolution technology of $3^{rd}$ Generation Partnership Project, 3GPP, or a new radio technology of a $5^{th}$ Generation, 5G, of the 3GPP, and wherein the second radio link is based on the new radio technology of the $5^{th}$ Generation, 5G, of the 3GPP.

3. The user equipment according to claim 1, wherein the processing circuitry, when in operation, measures parameters of the first radio link and/or the second radio link and compares the measured parameters to a threshold value, and the processing circuitry, when in operation, determines to transmit the radio link selection message based on a result of comparing the measured parameters to the threshold value.

4. The user equipment according to claim 1, wherein the transmitter, when in operation, transmits the radio link selection message within a Medium Access Control, MAC, Control Element.

5. The user equipment according to claim 1, wherein the processing circuitry, when in operation, determines that the first base station is to forward data packets either:
  via the first radio link only; or
  via the second radio link only.

6. The user equipment according to claim 1, wherein a first radio link identity, assigned to the first radio link, is different from a second radio link identity, assigned to the second radio link, wherein the information comprised in the radio link selection message on the at least one radio link comprises the first radio link identity and/or the second radio link identity; and
  wherein a receiver of the user equipment, when in operation, receives the first radio link identity and/or the second radio link identity from the first base station.

7. The user equipment according to claim 1, wherein the user equipment is connectable to the first base station and the second base station using a split bearer, split between the first base station and the second base station, wherein a Packet Data Convergence Protocol, PDCP, layer of the user equipment is shared for the split bearer, and the data packets are PDCP protocol data units, PDCP PDUs; or
  wherein the user equipment is connectable to the first base station and the second base station separately via two bearers.

8. The user equipment according to claim 1, wherein the processing circuitry, when in operation, operates the report timer to control transmission of the reception report for the series of data packets received from the first base station and the second base station, and
  wherein the processing circuitry, when in operation, in response to the report timer expiring, generates the reception report, the reception report indicating the data packets successfully received from the first base station and the second base station.

9. The user equipment according to claim 3, wherein the processing circuitry, when in operation, further determines to transmit the reception report:
  when the measured parameters of the first radio link and/or second radio link change by at least a specific amount compared to respective previously measured parameters.

10. The user equipment according to claim 1, wherein the transmitter, when in operation, transmits the reception report together with the radio link selection message to the user equipment.

11. A method for operating a user equipment in a mobile communication system, comprising the following steps performed by the user equipment:
  determining at least one radio link via which a first base station is to forward data packets to the user equipment, the user equipment being connectable to both the first base station via a first radio link and to a second base station via a second radio link;
  transmitting a radio link selection message to the first base station, the radio link selection message comprising information on the determined at least one radio link for instructing the first base station via which at least one radio link to forward the data packets to the user equipment;
  starting a report timer in response to a first data packet, of a series of data packets, being detected as missing;
  in response to the report timer expiring, determining to transmit a reception report to the first base station; and
  determining to refrain from transmitting the reception report in response to a number of data packets detected as missing being below a specific number.

12. The method according to claim 11, wherein:
  the series of data packets are transmitted from the first base station and the second base station; and
  the method includes generating the reception report, the reception report indicating the data packets successfully received from the first base station and the second base station.

13. A first base station in a mobile communication system, the first base station comprising:
  a receiver, which in operation, receives a radio link selection message from a user equipment, the user equipment being connectable to both the first base station via a first radio link and to a second base station via a second radio link, the radio link selection message comprising information on an at least one radio link via which the first base station is to forward data packets to the user equipment;
  processing circuitry, which in operation, determines at least one radio link via which to forward the data packets to the user equipment, based on the received radio link selection message; and
  a transmitter, which in operation, forwards the data packets via the determined at least one radio link to the user equipment, wherein:
    the receiver, in operation, receives a reception report transmitted by the user equipment in response to a report timer expiring, the user equipment starting the report timer in response to a first data packet, of a series of data packets, being detected as missing, and the user equipment determining to refrain from transmitting the reception report in response to a number of data packets detected as missing being below a specific number.

14. The first base station according to claim 13, wherein:
  the reception report indicates data packets successfully received by the user equipment from the first base station and the second base station;
  the processing circuitry, when in operation, performs determining the at least one radio link via which to forward the data packets based on the reception report; and
  wherein the processing circuitry, when in operation, determines whether and via which radio link to transmit data packets not successfully received by the user equipment, based on the reception report.

15. The user equipment according to claim 3, wherein the parameters of the first radio link and of the second radio link comprise at least one of the following parameters:
  reference signal received power, RSRP;
  reference signal received quality, RSRQ; and
  Signal to Noise ratio, SNR.

16. The user equipment according to claim 1, wherein the processing circuitry, when in operation, measures parameters of the first radio link and/or the second radio link and compares the measured parameters to previously measured parameters, and the processing circuitry, when in operation, determines to transmit the radio link selection message based on a result of comparing the measured parameters to the previously measured parameters; and
  wherein the parameters of the first radio link and of the second radio link comprise at least one of the following parameters:
    reference signal received power, RSRP;
    reference signal received quality, RSRQ; and
    Signal to Noise ratio, SNR.

17. The user equipment according to claim 1, wherein the processing circuitry, when in operation,
  determines that the first base station is to forward data packets via both the first radio link and the second radio link; and
  determines a ratio between data packets to be forwarded via the first radio link and via the second radio link, the ratio being included in the radio link selection message.

18. The user equipment according to claim 1, wherein the processing circuitry, when in operation,
  determines that the first base station is to forward data packets via both the first radio link and the second radio link; and
  determines that the data packets are to be duplicated via the first radio link and the second radio link, the radio link selection message comprising information on duplicating the data packets.

* * * * *